US009966769B2

(12) United States Patent
Srinivasan et al.

(10) Patent No.: US 9,966,769 B2
(45) Date of Patent: May 8, 2018

(54) CAPACITY INDEPENDENT FAST CHARGING OF BATTERIES

(71) Applicant: The Johns Hopkins University, Baltimore, MD (US)

(72) Inventors: Rengaswamy Srinivasan, Ellicott City, MD (US); Bliss G. Carkhuff, Laurel, MD (US); Lakshminarayan Srinivasan, Menlo Park, CA (US)

(73) Assignee: The Johns Hopkins University, Baltimore, MD (US)

( * ) Notice: Subject to any disclaimer, the term of this patent is extended or adjusted under 35 U.S.C. 154(b) by 96 days.

(21) Appl. No.: 15/083,193

(22) Filed: Mar. 28, 2016

(65) Prior Publication Data

US 2017/0149256 A1    May 25, 2017

Related U.S. Application Data

(60) Provisional application No. 62/259,166, filed on Nov. 24, 2015.

(51) Int. Cl.
| | |
|---|---|
| *H02J 7/00* | (2006.01) |
| *H01M 10/48* | (2006.01) |
| *H01M 10/46* | (2006.01) |
| *H01M 10/44* | (2006.01) |
| *H01M 10/0525* | (2010.01) |

(52) U.S. Cl.
CPC ....... *H02J 7/0021* (2013.01); *H01M 10/0525* (2013.01); *H01M 10/44* (2013.01); *H01M 10/443* (2013.01); *H01M 10/46* (2013.01); *H01M 10/48* (2013.01); *H01M 10/486* (2013.01); *H02J 7/007* (2013.01)

(58) Field of Classification Search
CPC .. H01M 2200/10; H02J 7/0021; H02J 7/0091; H02J 7/047
USPC ................................ 320/107, 132, 134, 150
See application file for complete search history.

(56) References Cited

U.S. PATENT DOCUMENTS

| | | | | | |
|---|---|---|---|---|---|
| 5,656,917 | A | * | 8/1997 | Theobald | ............. H01M 10/44 320/106 |
| RE39,691 | E | * | 6/2007 | Sakakibara | ......... H01M 10/443 320/150 |
| 8,961,004 | B2 | * | 2/2015 | Srinivasan | ............. H01M 2/34 320/150 |

OTHER PUBLICATIONS

Rengaswamy Srinivasan et al., Electrochimica Acta 56,"Instantaneous Measurement of the Internal Temperature in Lithium-Ion Rechargeable Cells", Elsevier, 2011, pp. 6198-6204.

(Continued)

*Primary Examiner* — Nghia Doan
(74) *Attorney, Agent, or Firm* — Todd R. Farnsworth

(57) ABSTRACT

A battery charging monitor is provided including a non-invasive sensor electrically connected to at least one battery cell of at least one battery, which is configured to measure an internal temperature of the at least one battery cell. The non-invasive internal temperature sensor is connected to the microcontroller that is configured to determine a rate of change of the internal temperature of the at least one battery cell based on the internal temperature of the at least one battery cell, determine a state of charge of the at least one battery cell based on the rate of change of the internal temperature, and cause a charging rate to be applied, by a battery charger, to the at least one battery cell based on the determined state of charge.

19 Claims, 9 Drawing Sheets

(56) References Cited

OTHER PUBLICATIONS

Rengaswamy Srinivasan et al., Journal of Power Sources 241, Empirical Analysis of Contributing Factors to Heating in Lithium-Ion Cells: Anode Entropy Versus Internal Resistance, Elsevier, 2013, pp. 560-566.

Rengaswamy Srinivasan et al., Journal of Power Sources 293; "Graphitic Carbon Anode Temperature Excursions Reflect Crystallographic Phase Transitions in Lithium-Ion Cells", Elsevier, 2015; pp. 876-882.

Paulette Campbell, JHU/APL Press Release, APL-Stanford Team Uncovers Internal Temperature Maximum and Offers Path Toward Safer Fast-Charging Lithium-Ion Batteries, http://www.jhuapl.edu/newscenter/pressreleases/2015/150909.asp Sep. 9, 2015.

* cited by examiner

CAPACITY INDEPENDENT FAST CHARGING OF BATTERIES

TECHNICAL FIELD

Example embodiments generally relate to battery charging and, in particular, relate to capacity independent charging of batteries.

BACKGROUND

Rechargeable batteries, such as Lithium-ion batteries, experience heating of internal components, e.g., the anode and cathode, during charging. In an instance in which the anode temperature increases above 80 degrees Celsius, there is a possibility that exothermic reactions between the anode and the electrolyte may be initiated, leading to thermal runaway, venting, and/or a fire in the batteries. The charging rate of the batteries may be limited to a predetermined charging rate, such as 0.7 of the capacity of the battery to prevent overheating of the battery. The artificial limiting of the charging rate may significantly increase the time necessary to charge the battery.

In some instances, the actual capacity of the battery may be unknown. This can occur for a variety of different reasons. For example, ageing due to cycle life and calendar life can change the storage and discharge capacity of a battery. Another example is where the battery has been partially discharged to an unknown state. This would make it difficult to know how fast or how much the battery should be recharged to bring it to full capacity. Still another example is where the user may not have any, or accurate, information about the capacity of a given battery. The appropriate amount of charging current or the rate of charging has typically been based upon the capacity of the battery, and without knowledge of the battery's capacity, conservative charging current and charging rates have typically been employed to avoid overheating.

Some have attempted to address the overheating issue by configuring a battery charger to monitor the temperature of one or more batteries or one or more battery cells. The monitored temperature may be used for safety monitoring of the battery during charging, or to limit the charging rate in response exceeding a thermal threshold. However, multiple battery cell systems may only monitor representative cells, such as center and corner cells, low air flow cells, low cooling cells, or other cells which are likely to have higher than average temperatures. The temperatures of the representative cells, or in some cases, models derived from the representative cells may not be indicative of the highest cell temperature. Further, battery cell temperature monitoring is typically of a surface temperature of the monitored battery cells, which may not be indicative of the internal temperature of the battery cell or may have a significant delay. The uncertainties of monitoring reference battery cells and of monitoring battery cell surface temperatures may result in undetected temperature peaks, which may cause damage or failure of one or more battery cells.

SUMMARY

Accordingly, some example embodiments may enable the provision of a battery charging system, as described below. In one example embodiment, a battery charging monitor is provided including a sensor electrically connected to at least one battery cell of at least one battery which is configured to measure an internal temperature of the at least one battery cell, and a microcontroller. In such embodiments, the microcontroller can be configured to determine a rate of change of the internal temperature of the at least one battery cell based on the internal temperature of the at least one battery cell, determine a state of charge of the at least one battery cell based on the rate of change of the internal temperature, and cause a charging rate to be applied, by a battery charger, to the at least one battery cell based on the determined state of charge.

In another example embodiment, a battery charging monitor includes a sensor electrically connected to the at least one battery cell of at least one battery and a microcontroller. The sensor can be configured to measure an internal temperature of the at least one battery cell. The microcontroller can be configured to compare the internal temperature of the at least one battery cell to one or more charging temperature thresholds and cause a charging rate to be applied, by a battery charger, to the at least one battery cell based on the comparison of the internal temperature to the one or more charging temperature thresholds.

BRIEF DESCRIPTION OF THE DRAWING(S)

Having thus described the battery charging system in general terms, reference will now be made to the accompanying drawings, which are not necessarily drawn to scale, and wherein:

FIGS. 5A-F illustrate correlations between anode temperature or surface temperature and the transitions among stages of charging according to an example embodiment.

Figure 6:
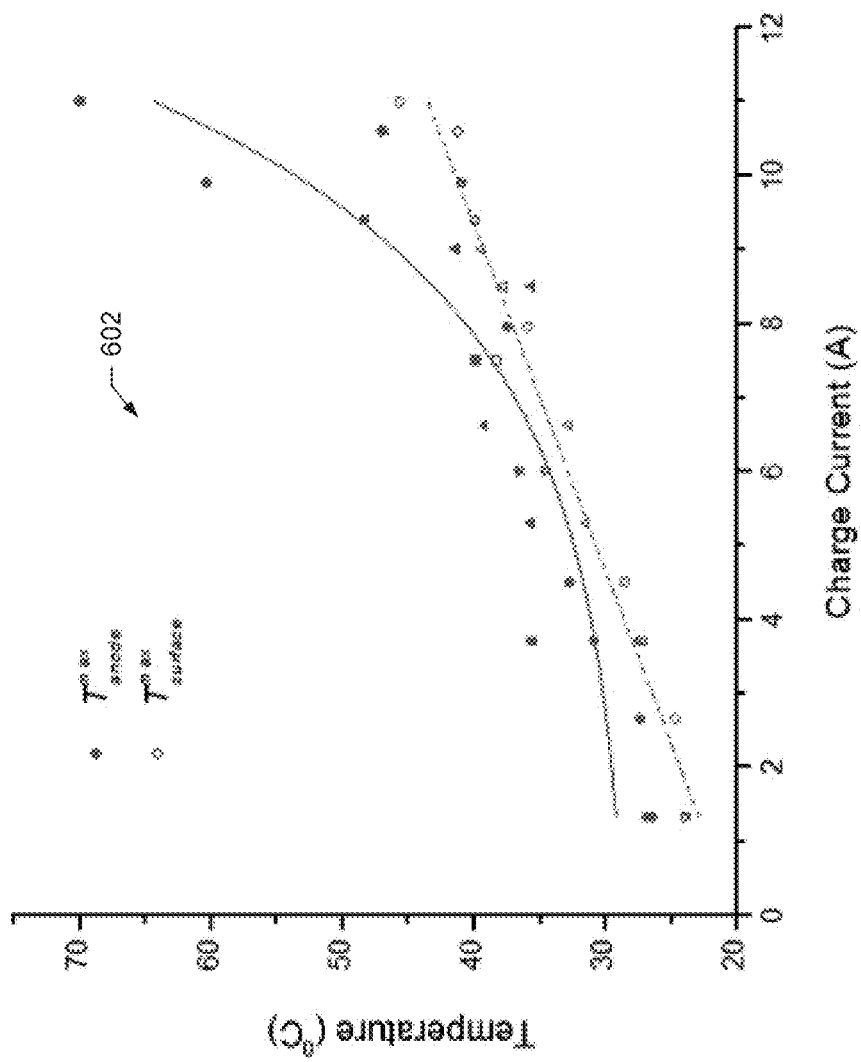

FIG. 6 illustrates a maximum anode temperature versus the charging rate compared to a maximum surface temperature verses charging rate according to an example embodiment.

Figure 7:
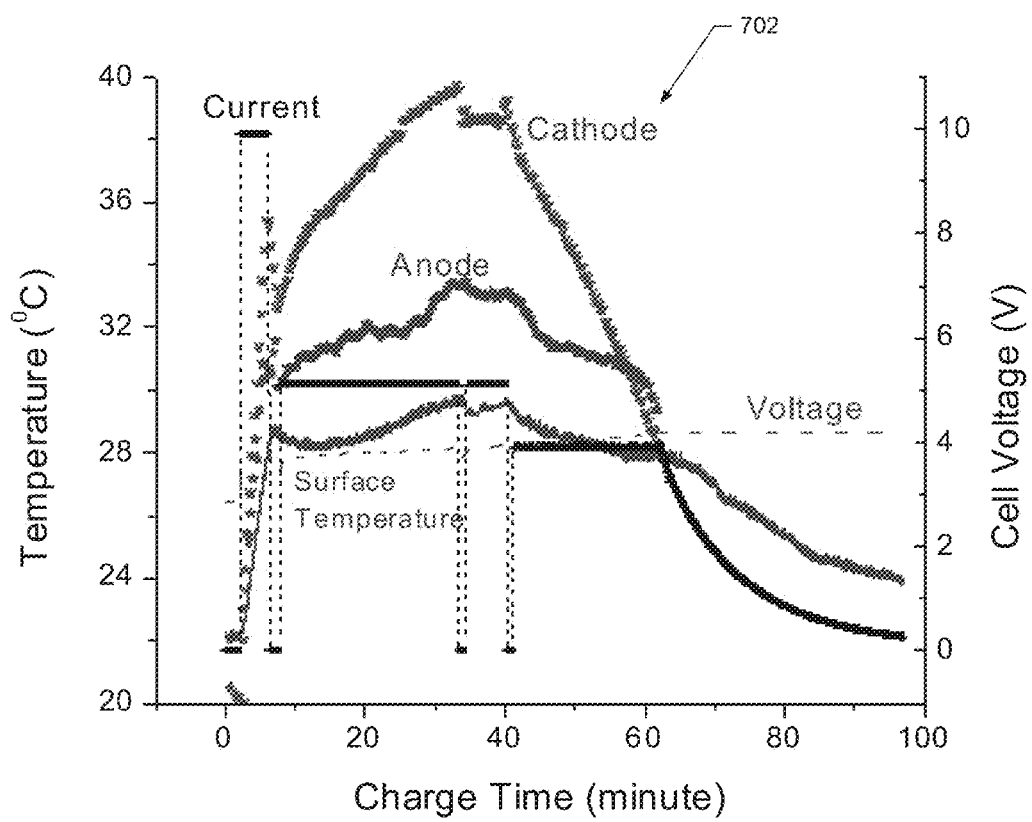

FIG. 7 illustrates an exemplary charging graph using a fast charging protocol according to an example embodiment.

Figure 8:
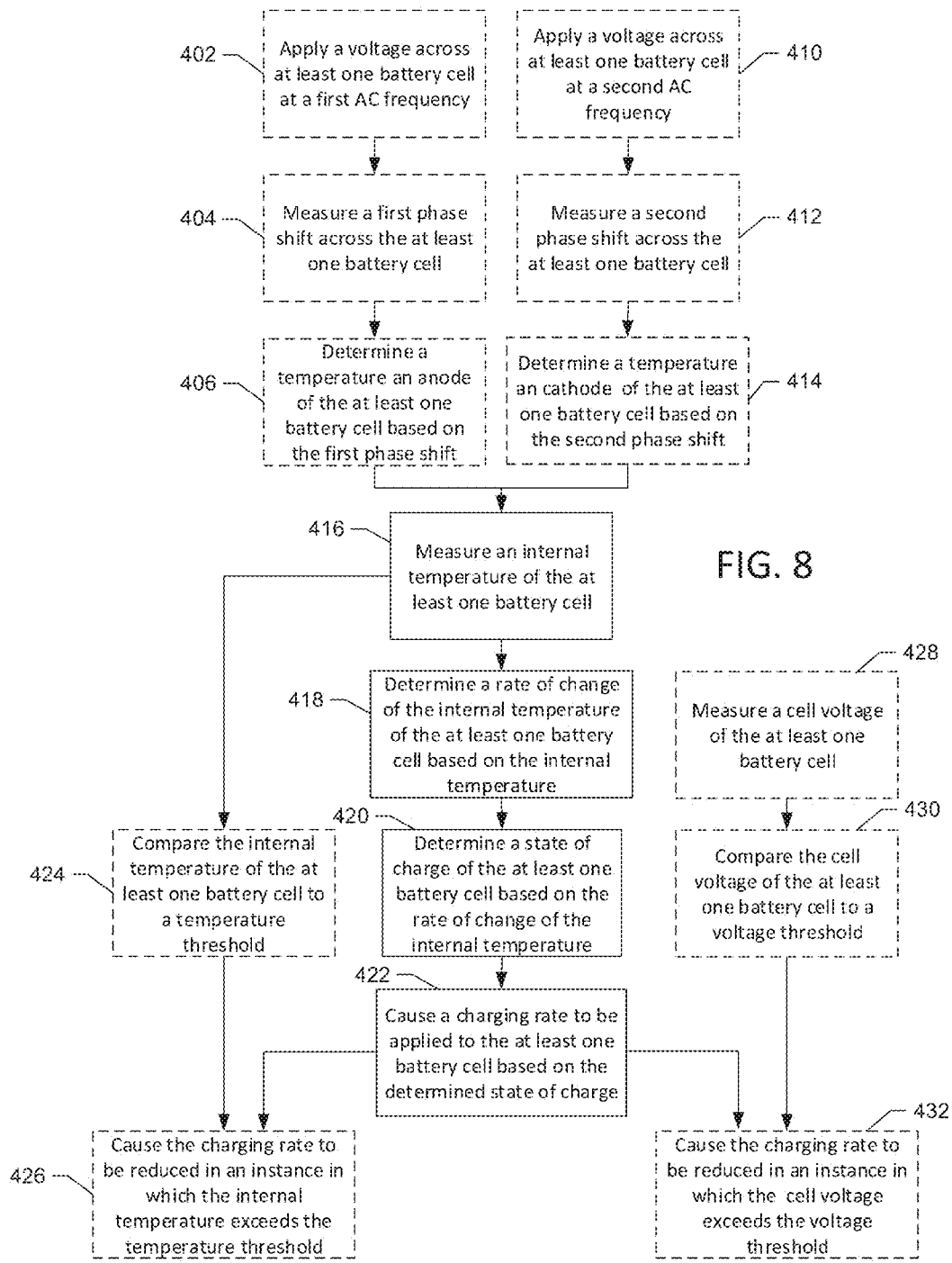

FIG. 8 illustrates a method for causing a charging rate to be applied to a battery based on a determined state of charge according to an example embodiment.

Figure 9:
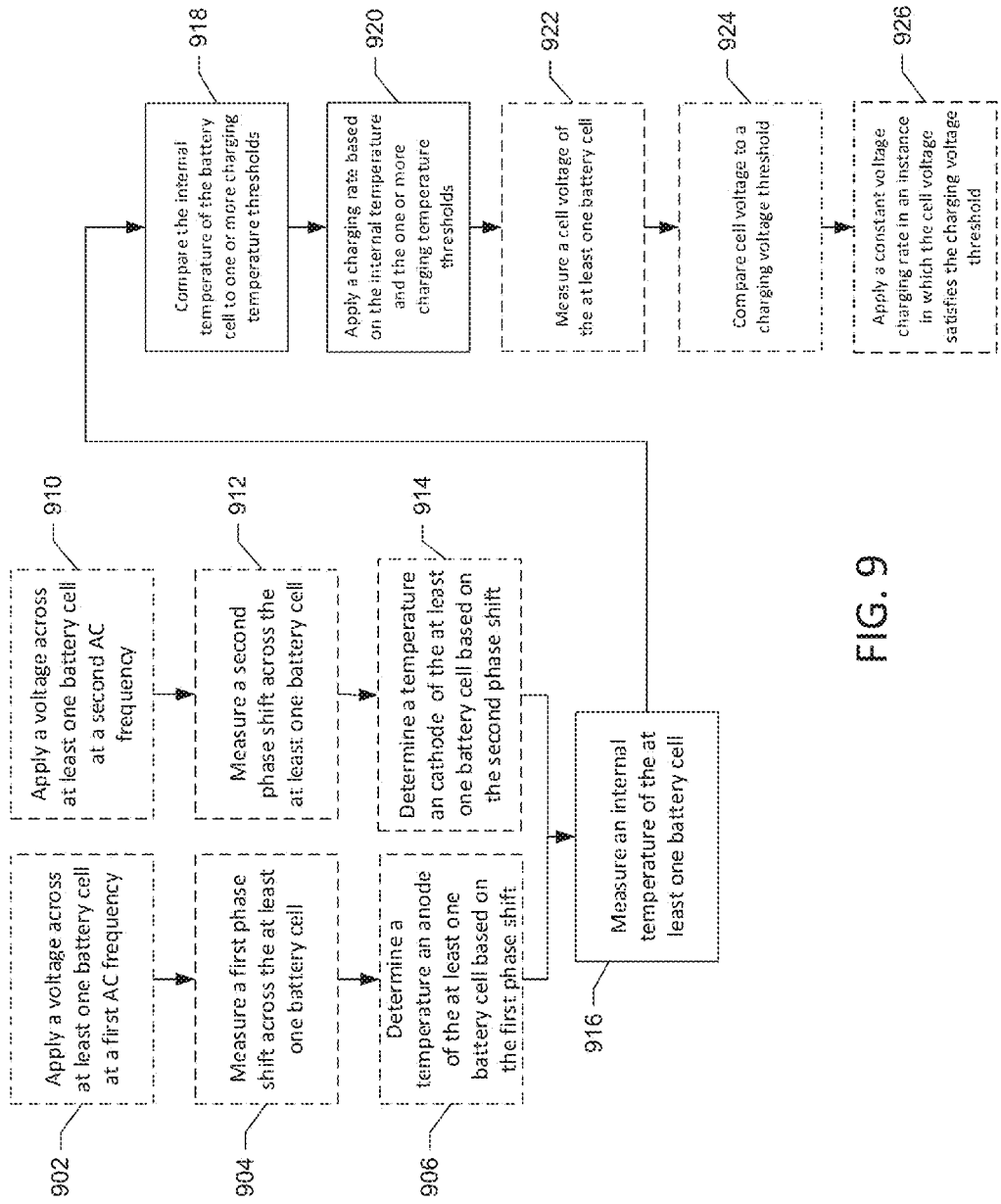

FIG. 9 illustrates a method for causing a charging rate to be applied to a battery based on an internal temperature of a battery cell according to an example embodiment.

DETAILED DESCRIPTION

Some example embodiments now will be described more fully hereinafter with reference to the accompanying drawings, in which some, but not all example embodiments are shown. The examples described and illustrated herein are intended to allow one skilled in the art to understand the claimed invention, and are not intended to, nor should they be seen as, limiting the scope, applicability, or configuration of the claims. Like reference numerals refer to like elements throughout. As used herein, operable coupling should be understood to relate to direct or indirect connection that, in either case, enables a functional interrelationship between the operably coupled components.

The term "charging rate" is defined herein as charging current divided by the theoretical current required to charge the cell in one hour, and it is expressed in terms of capacity (C) rate (hour-1). For example, a 0.5 C rate (e.g., 0.5 of the capacity of the battery) would charge a battery to half its capacity in one hour.

In some embodiments, a battery charging monitor may be provided to measure an internal temperature of a battery cell, or each respective battery cell or a battery. The internal temperature of the battery cell may be determined based on measuring a phase shift across the battery cell when a known alternating current (AC) voltage frequency is applied. The battery charging monitor may determine a rate of change of internal temperature of the battery cell based on the internal temperature measurements, which may be used to determine a state of charge of the battery cell. The battery charging monitor may cause a battery charger to apply a charging rate to the battery cell based on the state of charge of the battery. For example, the battery charger may apply a low charging rate, such as 0.7 of the capacity of the battery, during a first period of charging when the rate of change of internal temperature is high, and apply a high charging rate, such as 1-2 of the capacity of the battery, in a second period of charging in which the rate of change of internal temperature of the battery cell is low or negative. By monitoring the internal temperature and applying a charging rate based on the state of charge of the battery cell the charging time of the battery may be significantly reduce while increasing the safety of charging the battery.

In some example embodiments, the battery may include a plurality of battery cells. The battery charging monitor may include a multiplexor connecting each of the battery cells to the sensor. The battery charging system may measure the internal temperature of each of the battery cells, eliminating uncertainties of unmonitored battery cells. Further, thresholds may be set for various parameters to allow for higher charging rates, to increase safety, and for other advantages. For example, the battery charging monitor may monitor the internal temperature compared to a temperature threshold or a cell voltage compared to a voltage threshold, and reduce or terminate the applied charging rate in an instance in which the voltage threshold or temperature threshold is exceeded.

Figure 1:
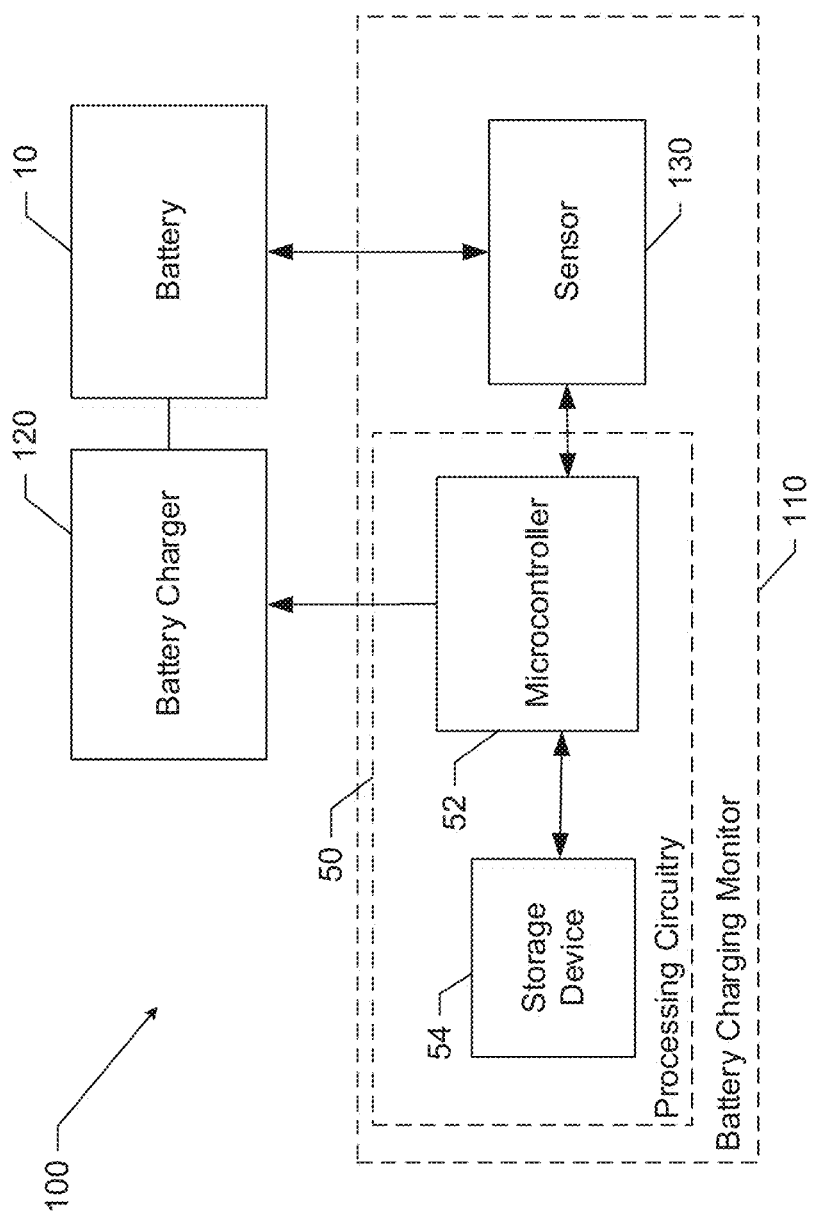
FIG. 1 illustrates a functional block diagram of an exemplary battery charging system.

FIG. 1 illustrates certain elements of an example battery charging system 100. The battery charging system 100 may be embodied in a single unit or multiple units, such as battery charging monitor 110, battery charger 120, and battery 10. Furthermore, it should be noted that the devices or elements described below may not be mandatory and thus some may be omitted in certain embodiments.

In the illustrated embodiment, the battery charging monitor 110 may include or otherwise be in communication with processing circuitry 50 and sensor 130. In this illustrated embodiment, the processing circuitry 50 may be configured to perform data processing, application execution, and other processing and management services. Processing circuitry 50 may include a storage device 54 and a processor, e.g., microcontroller 52 that may be in communication with or otherwise controls the battery charger 120 and sensor 130. As such, the processing circuitry 50 may be embodied as a circuit chip (e.g., an integrated circuit chip) configured to perform operations described herein (e.g., with hardware, software or a combination of hardware and software). However, in some embodiments, at least portions of the processing circuitry 50 may be embodied as a portion of a server, computer, laptop, workstation, or the like.

In embodiment illustrated in FIG. 1, the storage device 54 may include one or more non-transitory storage or memory devices such as, for example without limitation, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the microcontroller 52. Additionally or alternatively, the storage device 54 could be configured to store instructions for execution by the microcontroller 52. In alternative embodiments, the storage device 54 may include one of a plurality of databases that may store a variety of files, contents or data sets. Storage device 54 may also store, including internally as part of the aforementioned databases, applications for execution by the microcontroller 52 which allow microcontroller 52 to carry out the functionality associated with each respective application.

The microcontroller 52 may be embodied in a number of different ways. For example, the microcontroller 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the microcontroller 52 may be configured to execute instructions stored in the storage device 54 or otherwise accessible to the microcontroller 52. As such, whether configured by hardware or software methods, or by a combination thereof, the microcontroller 52 may represent an entity (e.g., physically embodied in circuitry) capable of performing operations according to embodiments of the present invention while configured accordingly. Thus, for example, when the microcontroller 52 is embodied as an ASIC, FPGA or the like, the microcontroller 52 may be specifically configured hardware for conducting the operations described herein. Alternatively, as another example, when the microcontroller 52 is embodied as an executor of software instructions, the instructions may specifically configure the microcontroller 52 to perform the operations described herein.

In an example embodiment, the microcontroller 52 (or the processing circuitry 50) may be embodied in, include, or otherwise control the battery charger 120. The processing circuitry 52 may control a charging rate applied to the battery 10 by the battery charger 120. The processing circuitry 50 may be configured to control the charging rate based on data from the sensor 130. Although illustrated as a single sensor 130, sensor 130 may in fact be capable of sensing a plurality of features, including, without limitation, temperature and phase shift. As described below in reference to FIG. 2, embodiments of sensor 130 may comprise a temperature sensor 130A and a phase shift sensor 130B. The sensor 130 may be configured to determine the internal temperature of at least one battery cell of the battery 10 based on a measured phase shift. In some embodiments, sensor 130 may be invasively inserted into battery 10, inserted into battery 10 at the time of manufacture, or sensor 130 may be capable of noninvasively sensing the desired feature(s). Such noninvasive sensing may be effectuated by means of a sensor 130 similar to that described in U.S. Pat. No. 8,961,044 entitled "Battery Phase Meter to Determine Internal Temperatures of Lithium-Ion Rechargeable Cells Under Charge and Discharge", the teaching and contents of which are incorporated by reference in their entirety. The processing circuitry 50 may compare the phase shift to phase to temperature conversion data (e.g., phase temperature correlations), which may be stored in storage device 54, to determine the internal temperature of the at least one battery cell of the battery 10. The processing circuitry 50 may be configured to determine a rate of change of the internal temperature and a state of charge for the at least one battery cell of the battery 10. The state of charge (SoC) may be determined by comparing the rate of change of the internal temperature of the at least one battery cell (ΔT) to ΔT to SoC conversion data (e.g., ΔT to SoC correlations), which may be stored in storage device 54. In an example embodiment, determining the SoC of at least one battery cell of the battery 10 may include determining a State transition, as described below in reference to FIGS. 4-6.

Figure 2:
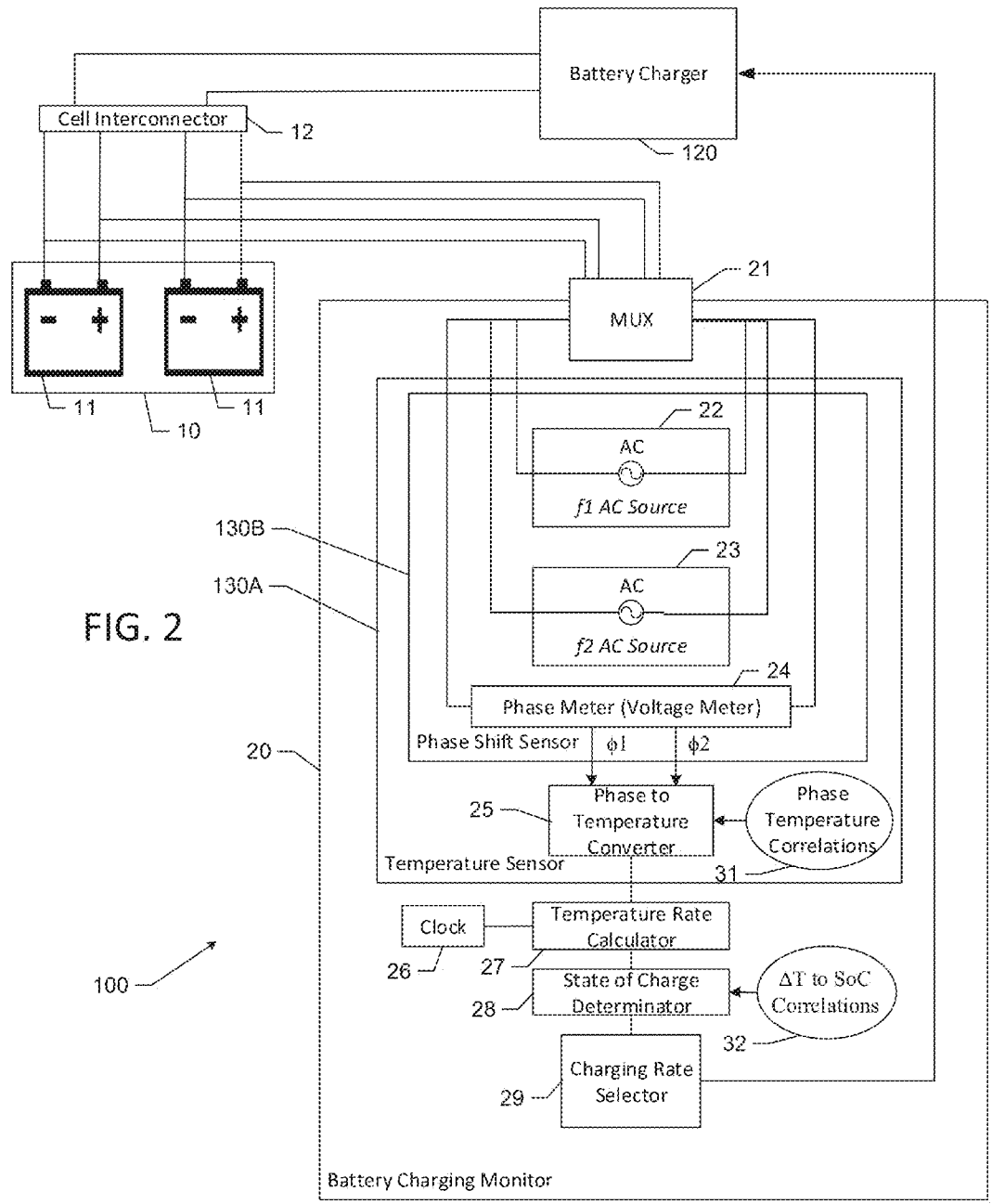
FIG. 2 is a detailed block diagram of an exemplary battery charging system.

FIG. 2 illustrates a battery charging monitor 20 according to an example embodiment. The battery charging monitor 20 may be configured to control the battery charger 120 and cause a charging rate to be applied the battery 10 based on a state of charge of the battery 10. The battery charging monitor 20 may determine the state of charge of the battery based on the rate of change of the internal temperature of the battery 10, which may be derived from measuring internal temperatures, e.g., anode temperature ($T_{anode}$) and cathode temperature ($T_{cathode}$) of the battery 10. The internal temperatures of the battery 10 may be based on corresponding frequency-dependent impedance domain of the battery 10.

The battery 10 may include a plurality of battery cells 11, e.g., lithium-ion cells. Each battery cell 11 may include an anode terminal and a cathode terminal, each in electrical contact with each other by a corresponding anode and cathode of the battery cell 11. Battery cells 11 may be interconnected with a cell interconnector 12, which may include a serial and/or parallel interconnect structure. Cell interconnector 12 may be implemented to selectively disconnect one or more of battery cells 11, such as in response to an indication of an overheating condition within the corresponding battery cell 11.

The temperature sensor 130A may include the phase shift sensor 130B to sense phase shifts due to an impedance of the battery cell 11. The phase shift sensor 130B may include multiple alternating or sinusoidal current sources 22, 23, each configured to apply alternating current at a corresponding frequency to the battery cells 11. The amplitude of the alternating currents applied to the battery 10 may be negligible to the battery 10, such as 1 mA and/or 1 mV. In some instances, the alternating current may be $\frac{1}{50}^{th}$, $\frac{1}{100}^{th}$, or the like of the capacity of the battery 10. The alternating currents may be applied to the battery cells 11 consecutively and/or concurrently. In FIG. 2, the current sources include first current source 22 and a second current source 23, each to generate a corresponding current. The current associated with the first current source 22 may have a frequency within a range of approximately 40 Hz to 500 Hz or 40 Hz to 100 Hz, such as 40 Hz, 70 Hz, 200 Hz, or the like. A frequency of the first current source 22 may be attributable to a graphite anode impedance and, more particularly, to the impedance of a solid electrolyte interphase (SEI) layer on the anode. In frequency domain associated with the first current source 22, impedance of battery cell 11 may be predominantly anode impedance.

The current associated with the second current source 23 may have a frequency within a range of approximately 1 Hz to 30 Hz or 20 Hz to 30 Hz, such as 5 Hz, 2 Hz, or the like. Applying the alternating current to a battery cell 11 results in an alternating voltage across the cathode and anode of the battery cell 11. A phase shift is detected as a difference between a frequency of the alternating current as applied form the first current source 22 or the second current source 23 and a frequency of the alternating voltage. A frequency of the second current source 23 may be attributable to the impedance of an SEI layer on cathode. In the frequency domain associated with the second current source 23, impedance of the battery cell 11 may be predominantly cathode impedance.

The phase shift sensor 130B may include multiplex circuitry 21 configured to selectively connect the first current source 22 and the second current source 23 to one of the battery cells 11, and to concurrently connect probes of a phase meter 24 to a corresponding one of the battery cells 11.

The phase shift sensor 130B may also include a phase meter 24 or another meter such as a voltage meter that is calibrated to measure phase shifts. The phase meter (voltage meter) 24 may be configured to detect a first phase difference, e.g., phase shift, and a second phase difference based on alternating currents generated by the first current source 22 and the second current source 23, and corresponding alternating voltage frequencies from the battery cells 11.

The phase meter 24 may include four probes, including current frequency probes and voltage frequency probes. The phase meter 24 may include an electrochemical interface potentiostat/galvanostat, and a frequency response analyzer, and/or portions thereof sufficient to detect phase differences. In an example embodiment, the phase meter 24 may include a voltage frequency sensor and a phase comparator to determine the phase shift between the alternating voltage resulting across and the alternating current incident across the positive and negative terminals of the individual battery cells 11. The phase shift between the first current source 22 or the second current source 23, and the resulting voltages are, respectively, measured by the voltmeter/phase comparator to determine a phase difference between the incident current and the resulting voltage from the first current source 22 for measuring the anode temperature and the resulting voltage from second current source 23 for measuring the cathode temperature in the battery cells 11. In an alternate embodiment, the first and second current sources 22, 23 may be a voltage source, in which case, the phase meter 24 may include a current meter/phase comparator to measure the phase shift between the incident current and the resulting voltage across the positive and negative terminals of the battery cells 11.

The temperature sensor 130A may include a phase-to-temperature converter 25 to convert an anode phase indication φ1 and cathode phase indication φ2 to one or more internal battery temperatures, e.g., $T_{anode}$ and $T_{cathode}$, respectively. The phase-to-temperature converter 25 may be embodied in the microcontroller 52 or processing circuitry 50. The phase-to-temperature converter 25 may receive phase temperature correlations 31, from a memory, such as storage device 54, or such a correlation may be built into a memory of the microcontroller 52 itself. The phase temperature correlations 31 may be generated based on testing of one or more battery cells 11 using a temperature detector similar to temperature sensor 130A, by changing the temperature of the battery 10 environment and allowing the internal battery temperature to stabilize with the environmental temperature.

Figure 3:
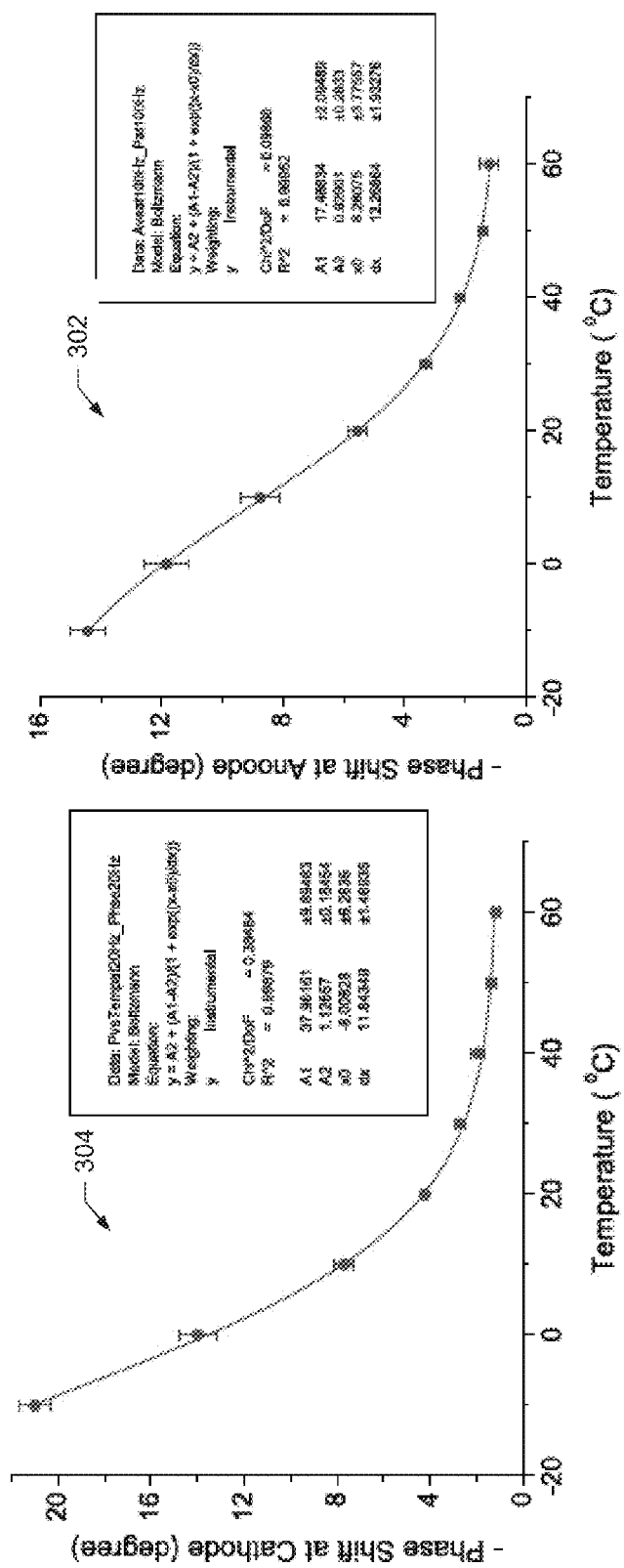
FIG. 3 illustrates phase shift-temperature correlations for anode temperature and cathode temperature according to an example embodiment.

The phase-to-temperature converter 25 may convert anode phase indication φ1 and cathode phase indication φ2 to $T_{anode}$ and $T_{cathode}$ based on the phase temperature correlations 31, such as illustrated in FIG. 3. In an example embodiment, phase-to-temperature converter 25 may determine a single internal battery cell temperature ($T_{cell}$) based on the $T_{anode}$ and $T_{cathode}$. The phase-to-temperature converter 25 may use only the $T_{anode}$ or average the $T_{anode}$ and $T_{cathode}$. In an example embodiment, the phase-to-temperature converter 25 may determine a weighted average of the $T_{anode}$ and $T_{cathode}$, such as $$T_{Batt} = (T_{anode} * 0.8 + T_{cathode} * 0.2)/2$$

$T_{anode}$ may include a higher weight in the weighted average due to having a faster response to charging and discharging than $T_{cathode}$.

The battery charging monitor 20 may determine a rate of change of the internal temperature for the battery cell 11. The battery charging monitor 20 may include a clock 26 configured to provide a clock pulse as a reference for determining a change in time. The battery charging monitor 20 may include a temperature rate calculator 27, such as embodied by the microcontroller 52 or processing circuitry 50, configured to receive the $T_{cell}$ from the temperature sensor 130A and the clock pulse from the clock 26. The temperature rate calculator 27 may determine the rate of change of the internal temperature of the battery cell 11 ($\Delta T$) by subtracting a current internal battery cell temperature $T_{cell}$ from the previous received internal battery cell temperature $T_{cell0}$, and dividing the difference by time(t) between receiving $T_{cell0}$ and $T_{cell1}$.

$$\Delta T = (T_{cell0} - T_{cell1})/(t_0 - t_1)$$

The battery charging monitor may include a state of charge determinator 28, such as embodied in the microcontroller 52 or processing circuitry 50, configured to determine the state of charge (SoC) of the battery 10 or battery cells 11. The state of charge determinator 28 may be configured to receive the rate of change of the internal temperature of the battery cell 11 from the temperature rate calculator 27 and $\Delta T$ to SoC correlations from a memory, such as storage device 54. The $\Delta T$ to SoC correlations may be determined through testing by charging the battery 10 or similar battery under various charging rates to determine correlations between the $\Delta T$ and SoC of the battery 10. The $\Delta T$ to SoC correlations are discussed in further details below in reference to FIGS. 4-6.

In an example embodiment, a battery cell 11 may have different $\Delta T$ at different points of charging the battery 10. For example, the battery cell 11 may have a high $\Delta T$, such as >1 degree Celsius per minute, at low SoCs, such as <50 percent. The $\Delta T$ may reach a thermal peak at a SoC of about 60 percent, after which the $\Delta T$ may be about zero or negative. By comparing the $\Delta T$ to the $\Delta T$ to SoC correlations the state of charge determinator 28 may determine a SoC for the battery 10 or for individual battery cells 11.

The battery charging monitor 20 may include a charging rate selector 29, such as embodied in the microcontroller 52 or processing circuitry 50, configured to select a charging rate for the battery charger 120 to apply to battery cells 11 of the battery 10. The charging rate selector 29 may be configured to select the charging rate based on the SoC of the battery 10 or an individual battery cell 11. In an example embodiment, the battery charging rate selector 29 may select a charging rate of about or less than 1.0 of the capacity of the battery, such as of 0.7 of the capacity of the battery 10, in an instance in which the battery 10 or individual battery cells 11 have not reached thermal peak, e.g., has a low SoC. The charging rate of about or less than 1.0 of the battery capacity, may allow for a constant charging rate to be applied without risk of the internal temperature of the battery cells 11 exceeding a safe limit or reaching thermal runaway. Continuing with the example, the charging rate selector 29 may select or increase the charging rate to greater than 1.0 of the capacity of the battery 10, in an instance in which the SoC is determined to be past the thermal peak, such as about 60 percent. In an example embodiment, the charging rate selector 24 may increase the charging rate up to 2.0 of the capacity of the battery 10.

In some example embodiments, the charging rate selector 29 may receive the internal temperature of the battery cells 11. The charging rate selector 29 may compare the internal temperature of the battery cells 11 to a temperature threshold, for example 70 degrees Celsius, which may a predetermine number of degrees less than a temperature at which exothermic reactions may occur within the battery 10 or individual battery cells 11. In an example embodiment in which the charging rate selector 29 determines the battery temperature exceeds the temperature threshold, the charging rate selector 29 may reduce the charging rate. For example, the charging rate selector 29 may reduce the charging rate to 0.5 of the previous charging rate, or reduce the charging rate to zero. The charging rate selector 29 may increase the charging rate to the charging rate associated with the SoC of the battery 10 or individual battery cells 11, in an instance in which the temperature threshold is not exceeded. In some example embodiments, the charging rate selector 29 may reduce the charging rate for a predetermined period of time, such as five minutes, to allow for the battery to cool down prior to increasing the charging rate.

Additionally or alternatively, the charging rate selector 29 may receive a voltage measurement of a battery cell 11, such as from the phase meter (voltage meter) 24. The charging rate selector 29 may compare the battery cell voltage to a voltage threshold, such as 4.0 Vdc. In an example embodiment, in which the charging rate selector 29 determines the battery cell voltage exceeds the voltage threshold, the charging rate selector 29 may reduce the charging rate. For example, the charging rate selector 29 may reduce the charging rate to half of the pervious charging rate, or reduce the charging rate to zero.

The charging rate selector 29 may increase the charging rate to the charging rate associated with the SoC of the battery 10 or individual battery cells 11 in an instance in which the voltage threshold is not exceeded. In some example embodiments, the charging rate selector 29 may reduce the charging rate for a predetermined period of time, such as five minutes, to allow for the battery voltage to stabilize prior to increasing the charging rate.

The charging rate selector 29 of the battery charging monitor 20 may cause the battery charger 120 to apply the selected charging rate to the battery 10.

FIG. 3 illustrates graphs, 302, 304 of phase shift versus temperature for $T_{anode}$ and $T_{cathode}$. The graphs 302, 304 may be utilized as calibrated phase temperature correlations. The $T_{cathode}$ graph 304 includes the phase shift values measured at 20 Hz of a Swing 4400 cell. The $T_{anode}$ graph 302 includes the phase shift values measured at 100 Hz of the Swing 4400 cell. Each point of the graphs may include an average of eleven measurements at eleven different SoCs of the Swing 4400 cell, between 5 percent and 95 percent. The lines of the graphs 302, 304 represent polynomial fits to the measured data.

Figure 4:
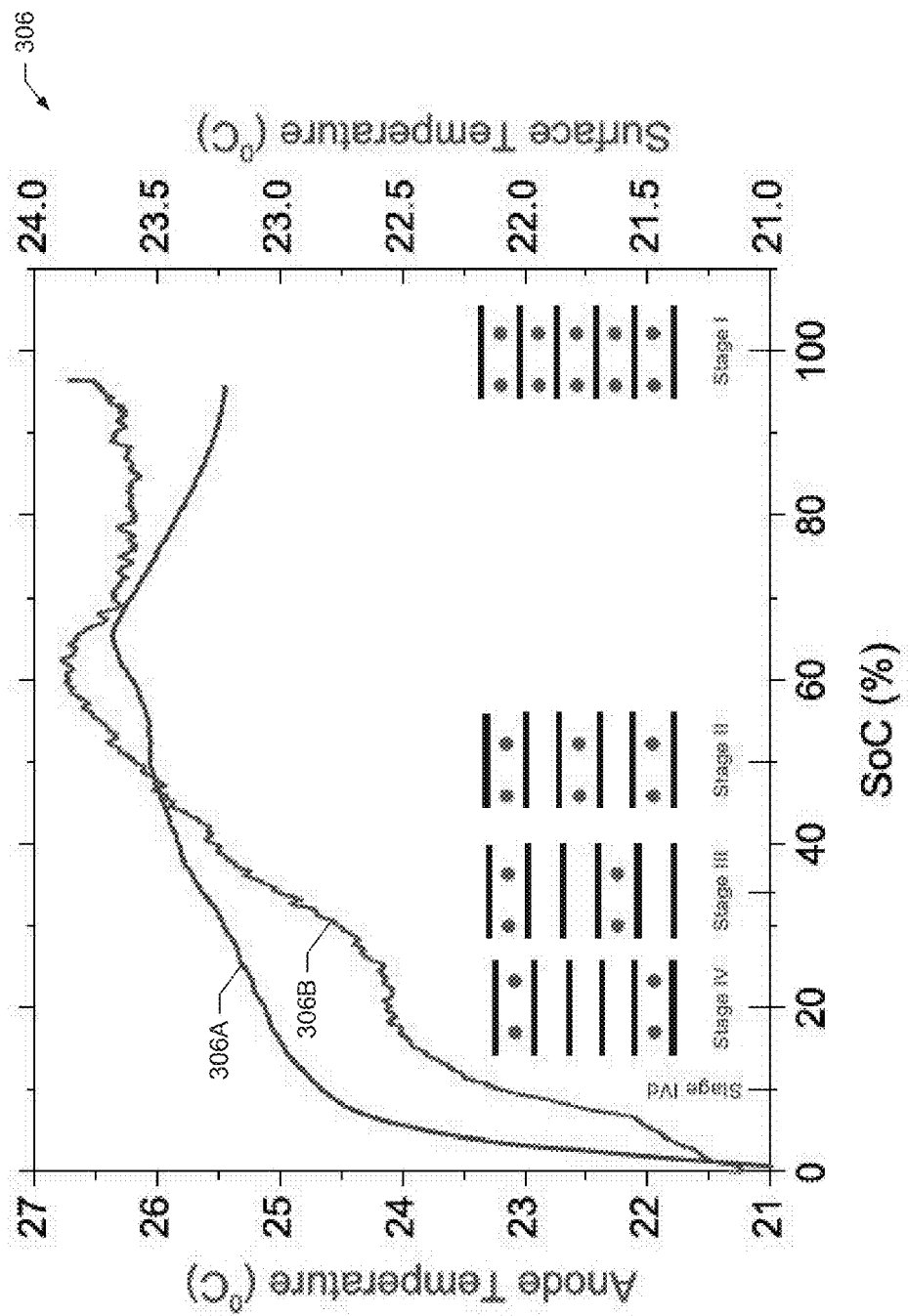
FIG. 4 illustrates a graph of anode temperature and surface temperature verses the state of charge according to an example embodiment.

FIGS. 4 and 5 illustrate the correlations between $T_{anode}$ and the transitions among Stages during charging of five different 5.3-Ah Boston Power Swing 5300 cells. The SoC reflects the percent of lithiation. During charging, $LiC_X$ proceeds in fixed order through four discernible lithiation phases (Stages), beginning with IV and ending with I. Each Stage is defined by a characteristic periodicity between Li-occupied and unoccupied graphite layers. As lithiation proceeds from 0% to 100% SoC, the $LiC_X$ stoichiometry is initially undefined, i.e., dilute Stage IVd at 10% SoC. At 20% SoC, the first distinguishable phase (IV) is structured with every fourth layer occupied, resulting in an approximate stoichiometry of $LiC_{30}$. Next in order are Stage III (34% SoC; every third layer occupied; $LiC_{18}$), Stage II (50% SoC; every other layer occupied; $LiC_{12}$), and Stage I (100% SoC; every layer occupied; $LiC_6$). Transitions between these Stages of lithiation are accompanied by thermal energy changes, within the battery 10, such as at the anode. The thermal energy changes may be due to a decrease in entropy associated with restructuring of lithium and carbon at the anode; resistive heating, caused when lithium passes from the electrolyte into the anode; and/or a change in the stacking, which defines the relative positions of the graphite layers. Each of these sources may contribute thermal energy to a variable extent as a function of SoC.

Figure 5A:
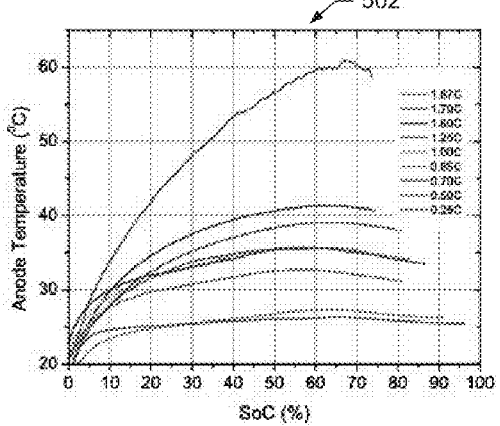
Figure 5D:
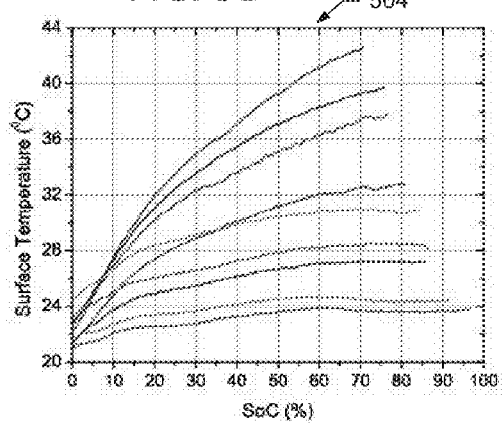
Figure 5B:
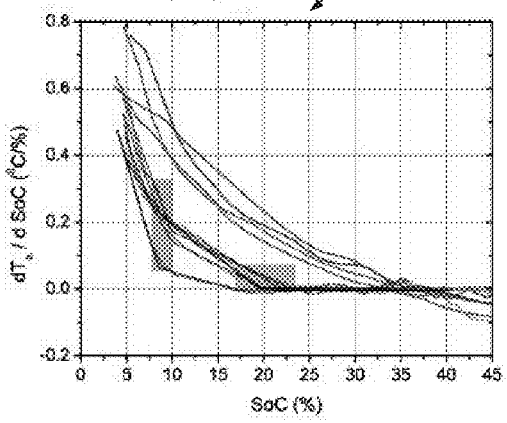
Figure 5E:
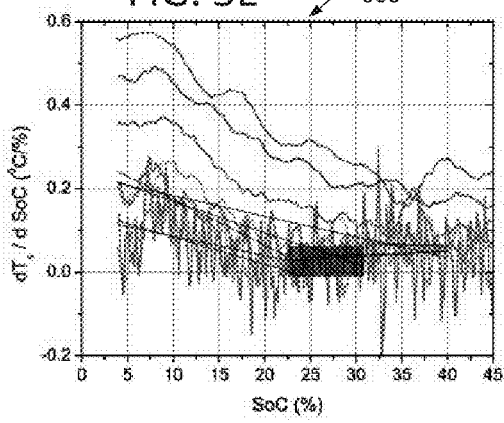
Figure 5C:
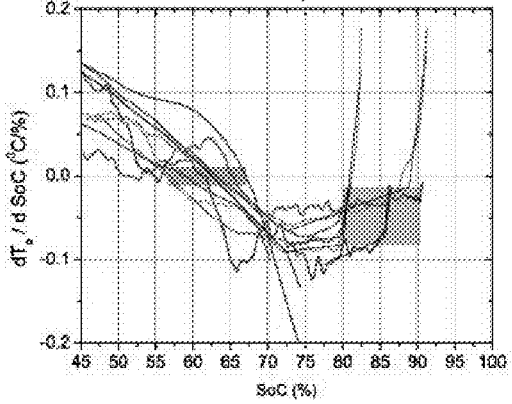

FIG. 5A-F includes anode temperature graphs 502 (FIG. 5A) and surface temperature ($T_s$) graph 504 (D). Graph 506 (FIG. 5B) and graph 512 (FIG. 5F) illustrate $\Delta Ta/\Delta SoC$ values, e.g., dTa/dSoC, values derived from the first difference of data in graph 502 (FIG. 5A); and, graph 508 (FIG. 5E) and graph 512 (FIG. 5F) illustrate $\Delta Ts/\Delta SoC$ values, e.g., dTs/dSoC derived from the first difference of data in graph 504 (FIG. 5D) followed by an application of a 13 point moving average. In graph 506 (FIG. 5B), at each charging rate, for data between 4% and 40%, a two-transition-point piecewise-linear model relating SoC to $\Delta Ta/\Delta SoC$ was fit using an iterative procedure to minimize squared error in predicted versus actual $\Delta Ta/\Delta SoC$. The fit was repeated separately for the interval between 70% and (up to) 92% SoC data in graph 510 (FIG. 5C). This procedure is equivalent to maximum-likelihood parameter estimation with a piecewise linear-Gaussian model.

Each piecewise-linear model contained parameters representing two transition points (p1 and p2) between three linear regions defined by slope and intercept parameters (a1, az, a3, b1, b2, b3) constrained by continuity at the transition points:

$$\frac{dTa}{dSoC} = \begin{cases} \frac{a_1(p_1 - SoC) + a_3(SoC - b_1)}{p_1 - b_1} & SoC \leq p_1 \\ \frac{a_3(b_2 - SoC) + a_2(SoC - p_1)}{b_2 - p_1} & p_1 \leq SoC \leq p_2 \\ \left(\frac{a_3(b_2 - p_2) + a_2(p_2 - p_1)}{b_2 - p_1}\right)\frac{SoC - b_3}{p_2 - b_3} & SoC \geq p_2 \end{cases}$$

FIG. 4 shows a set of $T_{anode}$ 306A and $T_s$ 306B data collected at 0.25 C charging rate (e.g., 0.25 of the capacity of the battery). The percent states of charge at which five stages occur are indicated with hash-marks on the x-axis: Stage IVd at 10%; of Stage IV ($LiC_{30}$) at 20%; of Stage III ($LiC_{18}$) at 34%; Stage II ($LiC_{12}$) at 50%; and Stage I ($LiC_6$) at 100%. Each Stage between IV and I corresponds to a phase that specifies the organization of lithium-filled and lithium-unfilled graphite layers, depicted above the hash marks. In Stage IVd, lithium is distributed randomly between the layers.

Various continuous piecewise-linear statistical models were computed using maximum likelihood estimation to automatically determine best transition points for each charging rate. The continuous piecewise-linear statistical models describe rate of change of $T_{anode}$ ($\Delta Ta/\Delta SoC$) as a function of SoC. Model estimates are indicated for $\Delta Ta/\Delta SoC$ versus SoC collected within 0.25 C and 1 C charging rates. At rates higher than 1 C, $\Delta Ta/\Delta SoC$ changes continuously with SoC, and the piecewise linear model did not identify different segments. These results are presented in graph 506 (B) for the SoC in the 4%-45% range and in graph 510 (FIG. 5C) for the SoC in the 45%-92% range. The shaded areas of the graphs 502-512 (FIGS. 5A-F), represent 100% non-parametric (empirical) confidence intervals on the transitions clustered around 8.98% SoC, 20.28% SoC and 85% SoC, respectively. The shade clusters in graph 504 (B) match closely with Stage IVd and Stage IV transitions, occurring respectively at 10% and 20% SoC. The sharp increase in $\Delta Ta/\Delta SoC$, centered at 85% SoC (right side shading of graph 510 (FIG. 5C)), corresponds to phase transition towards Stage I.

Figure 5F:
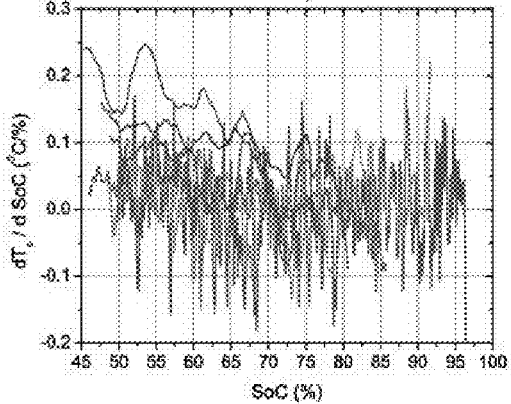

In contrast to anode temperature, the surface temperature reflects some of these phase transitions at the slowest rate of charge, as reflected in FIG. 4, but not for faster rates of charge, as depicted in graphs 504 (FIG. 5D), 508 (FIG. 5E), and 508 (FIG. 5F). At 0.25 C rate of charge depicted in FIG. 4, the surface temperature rose sharply during the initial stages of lithiation, showed a step change around 20% SoC (Stage IV), a maximum around 60% SoC, and a sharp increase around 95% SoC. However, these changes were not systematically manifest in $T_s$ and dT/dSoC versus SoC across various rates of charge ranging from 0.25 C to 1.87 C (graphs 504 (FIG. 5D), 508 (FIG. 5E), and 508 (FIG. 5F)). Automated detection of phase transitions on the (surface temperature) dT/dSoC versus SoC data was performed using the piecewise-linear statistical model applied to anode temperature. Only one transition was identified, centered at 25.7% SoC (dark gray shade of graph 510 (FIG. 5E)), where no known transitions in the structure of lithiated graphite exists. Additionally, the intermediate maximum temperature evident in the $T_{anode}$ segmentation was only manifest in $T_s$ at the slowest charging rate. A comparison of the T vs. SoC and dT/dSoC vs. SoC traces indicate that both thermal inertia and substantial differences in noise between the anode and surface temperature measurements contribute to the relative insensitivity of surface temperature to phase transitions.

Graph 502 (A) depicts the maximum in the anode temperature ($T_{aMAX}$), occurring around 61% SoC at all rates of charging (in the 0.25 C-1.87 C range) and the cycle life of the cell (5-75 cycles). The slopes of the data in graph 502(A), expressed as $\Delta Ta/\Delta SoC$ in graph 510 (FIG. 5C), show the $T_{aMAX}$ as a transition in the slope from positive to negative. The left side shading of graph 510 (FIG. 5C), represents the 100% confidence-bound of the transition that is clustered around 61% SoC. This shaded region representing the 61% SoC was not identified by the piecewise-linear statistical model, but is identified visually where the sign of the $\Delta Ta/\Delta SoC$ slope transitioned from positive to negative. Unlike the occurrence of $T_{aMAX}$ in the anode temperature, at charge rates >0.5 C, $T_s$ does not show distinct maximums (see Graphs 504 (FIG. 5D) and 512 (FIG. 5F)). $T_s$ increases with SoC, and either maintains a high value or continues to increase with charging. Unlike $T_{anode}$, $T_s$ also changes more slowly with SoC at all charging rates, indicating faster heat generation at the anode than inferred by the temperature at the surface.

Up to 61% SoC the rate change in $T_{anode}$ with SoC is positive, becoming more rapid with increase in charging rate. The unique maximum for $T_{anode}$ is a good predictor of the charging rate at which an anode might reach a limit, such as 80 degrees Celsius, where the battery cell 11 may become thermally unstable. The maxima in the anode temperatures at different charging rates are grouped together in the form of $T_{aMAX}$ vs. C-Rate graph, as depicted in FIG. 6. For comparison purposes, FIG. 6 also shows the concurrently collected $T_{aMAX}$ vs. C-Rate data, where $T_{sMAX}$ is the maximum in the surface temperature. $T_{sMAX}$ rises slowly below 1 C rate, accelerates above 1 C rate, and exceeds 60 degrees Celsius at 1.87 C rate. In contrast to $T_{aMAX}$, $T_{sMAX}$ increases linearly with charging rate, reaching only 40 degrees Celsius even at the 2 C rate. $T_{aMAX}$ remains consistently below $T_{aMAX}$ across the 0.25 C-2.1 C range, the difference between them widening by more than 20 degrees Celsius toward the higher end of the charging rate.

The transitions in $T_{anode}$ may be correlated to the heat generation that coincides with lithiation. Heat is released during lithiation by two different phenomena, entropy changes ($\Delta S_a$) associated with the restructuring of lithium and carbon at the anode to form $LiC_X$, and resistive heating ($R_a$) due to the flow of lithium across the anode/electrolyte interface. Both $\Delta S_a$ and $R_a$ are not uniform across 0%-100% SoC, therefore the heat release varies widely across the range of SoC. Noticeable step changes in $\Delta S_a$ and $R_a$ occur at the Stage transition at 10%, 50% and past 90% SoC. $\Delta S_a$ and $R_a$ are both largest between 0% and 10% SoC, i.e., through the completion of Stage IVd, and they remain small and nearly constant between 20% and 50% SoC (Stage IV to Stage II). $R_a$ decreases continuously between 50% and 100% SoC (past the completion of Stage 11). $\Delta S_a$ is negligible between 50% and 90% SoC, however, increases sharply above 90%. Wherever a rapid release of heat occurs, through the first 10% of lithiation, between 10% and 20% lithiation, and past 85% lithiation, the rapid releases in heat are easily discernible in the anode temperature data in graphs 506 (B) and 510 (C). The resulting changes in $\Delta Ta/\Delta SoC$ are sharp and the unsupervised piecewise linear model unambiguously identifies the phase transitions at Stages IVd, IV and I.

Analogous to the Stage transition points, the observation of the maximum, $T_{aMAX}$ in the anode temperature coincides with changes in the stacking of layers in graphite. Quantum mechanical calculations show that lithiation causes the stacking in graphite lattice to transition from AB to AA. In its native or non-lithiated state, the layers or basal planes in graphite are staggered (AB) such that the rotation axis of every six-member carbon-carbon ring in each layer is not aligned with the rings in the layers above and below. The stacking continues to remain AB up to Stage II (50% SoC) and completes transition to AA in Stage I (100% SoC). In AA stacking, the six-member carbon-carbon rings between the layers line along the rotational axis. The enthalpy of graphite with AA staking is higher by 0.27 kcal/mol than the enthalpy of graphite with AB stacking. The rearrangement therefore needs energy input into graphite. The energy needed for transition may be obtained from the anode, and if the transition started long before Stage I formation was complete, then energy transitions may cause the observed decrease in the anode temperature. Furthermore, the unoccupied graphite layers in Stages IV, III and II are more compressed than those in normal graphite, and they are pushed farther apart during the Stage II to Stage I transition, possibly absorbing thermal energy and decreasing $T_{anode}$.

As lithiation goes past 80% SoC, the stoichiometry tends towards $LiC_6$, a phase that is energetically more favorable than the $LiC_{12}$ phase found in Stage II (50% SoC). Neutron scattering shows that the AA stacking allows an energetically favored Li—$C_6$—Li—$C_6$—Li chain to exist along the c-axis of graphite, with a partial covalent bond between Li and C. These two processes, lithiation and neutron scattering, release energy, and are recorded in the increasing temperature of the anode past 80% SoC.

There is an intrinsic relationship between $T_{anode}$ and phase transitions in the graphitic anode of Li-ion cells. By measuring $T_{anode}$ based on phase shift, e.g., using an impedance technique, the anode temperature versus state of charge and their crystallographic basis during charging, spanning various rates of charging and cycle lifetimes may be identified. Charging causes lithiation of graphite, transforming its lattice through five Stages that are marked by sharp changes in anode entropy and anode resistance. Non-uniform amounts of thermal energy, punctuated by sharp changes in $\Delta Ta/\Delta SoC$ at phase transitions into each Stage, are released at the anode throughout charging due to the entropy and resistance. Most reproducibly, Stage IVd at 10% SoC, Stage IV at 21% SoC and Stage I around 85% SoC are marked by segmented transitions in $\Delta Ta/\Delta SoC$ as identified by an unsupervised piecewise-linear model describing $\Delta Ta/\Delta SoC$ as a function of SoC.

Unlike the transitions in $T_{anode}$ at Stages IVd and II, the final transition near 85% SoC may mark the start of a rapid and sustained increase in $T_{anode}$. Additionally, $T_{anode}$ may consistently achieve a maximum near 61% SoC over a wide range of charging rates between 0.25 C and 1.87 C. $T_{anode}$ may increase between 0% and 61% SoC at all charging rates. As lithiation progresses past Stage II, $T_{anode}$ may decrease between 61% SoC and 85% SoC. In fully lithiated graphite (100% SoC) the interlayer distances may be greater than in normal graphite, and that layers slide over to form the energetically-favored AA stacking. These post-Stage II changes in the crystal lattice may coincide with smaller thermal energy release by entropy and resistive heating than during the pre-Stage II lithiation. The heat may be absorbed by the enthalpy changes associated with reorganizations in the stacking and work associated with the increase in the interlayer distance in the graphite lattice around 61% SoC. In addition, the concomitant drop in resistive heat generation also contributes to the drop in the anode temperature. Past 85%, $T_{anode}$ shows a sharp and sustained increase as the lithiated graphite enters Stage I, presumably due to release of energy due to the partial covalent bond formation along the Li—$C_6$—Li—$C_6$—Li chain. The temperature increase may also be caused by increased resistance to the incoming lithium into a graphite lattice that is already filled with lithium to its near-full capacity.

Simultaneous cell-surface temperature measurements may not detect the SoC-dependent changes which may be observed in anode temperature measurements. As such, there may not be any correspondence between the surface temperature and Stage formations or the occurrence of a maximum in temperature during charging. Additionally, $T_s$ may lag $T_{anode}$ by hundreds of seconds and therefore underreport the temperature inside the battery 10 or battery cell 11 by 20 degrees Celsius or more, causing false sense of thermal safety. Surface-mounted temperature sensors may be misleading in attempts to ensure thermal safety of Li-ion cells at any rate of charging.

$T_{anode}$ measurements may make Li-ion cell charging both safer and faster. A $T_{anode}$-enhanced SoC estimation procedure may utilize the characteristic features in $T_{anode}$ to constrain SoC estimates to the range of values where stage transition features are known to occur. A closed-loop charging profile may incorporate $T_{anode}$ feedback on the cell state to minimize charging time without overheating. For example, a basic dynamic charging profile may exploit the observation that $\Delta Ta/\Delta SoC$ is negative for SoC greater than 61%. Based on cell voltage and/or $T_{anode}$ measurements, the charging rate could be increased when SoC passes 61%. In an example embodiment, the charging rate may be increased up to 2 C rate provided the battery cell voltage remains within the prescribed upper limit, e.g., temperature threshold. Ultimately, a combination of $T_{anode}$ and/or cell voltage could protect the cell from thermal runaway, improve state-of charge estimation and provide adaptive charging profiles that safely reduce charging time. In some example embodiments, determining the charging rate based on the SoC derived from the change in temperature rate of the internal temperature of the battery cell 11, may allow for a reduction in charging time of 17 percent or more without risking thermal runaway in the cells 11.

Additionally or alternatively, the battery charging monitor 100 may be configured to charge the battery 10 using a fast charging protocol based on internal temperature of the battery cell 11 and/or the cell voltage. FIG. 7 illustrates a charging graph 702 using a fast charging protocol. The charging graph depicts first charging of a 5.3 Ah Boston Power cell based on the internal temperature of the battery cell 11 and cell voltage. The internal temperature of the battery cell 11 and cell voltage may also be used as safety parameters.

In a conventional battery charging, a constant current, such as 0.5 of the capacity of the battery (e.g., 2.65 A for the example 5.3 Ah Boston Power cell) may be applied until a charging voltage threshold is reached, such as 4.2 V in the current example. Once the charging voltage threshold is reached, the charging method may be switched to a constant voltage, such as about the charging voltage threshold, as discussed 4.2 V in the current example. The constant voltage charging may be maintained until battery cell current drops to about 5 percent of the capacity of the battery, e.g., 0.26 A for the Boston Power cell. This charging protocol, e.g., "Constant Current-Constant Voltage" (CC-CV protocol), may take approximately 2.5 hours to charge a battery 10, such as the example 5.3 Ah Boston Power cell. The battery cell may reach 90 percent charged after about 115 minutes, during the constant current charging, and then advance from 90 to 99.9 percent of charge capacity in about 35 minutes during the constant voltage charging.

In contrast, using the fast charging protocol, such as illustrated in FIG. 7, the charging time may be significantly reduced. The battery charging monitor 100 may apply a first charging rate to the battery cell 11 at the start of the charge. The first charging rate may be a high charging rate, such as 1.87 of the capacity of the battery, e.g., 9.9 A in the current example. The first charging rate may be maintained until the internal temperature, e.g., $T_{anode}$ and/or $T_{cathode}$ of the battery cell 11 reaches or exceeds a first charging temperature threshold, for example 34 degrees Celsius and 40 degrees Celsius, respectively.

In an instance in which the internal temperature of the battery cell reaches or exceeds the first charging temperature threshold, the battery charging monitor 100 may reduce charging rate, such as reduce the charging rate to 0.5 of the capacity of the battery or set the charging rate to zero. The battery charging monitor 100 may maintain the reduced charging rate until the internal temperatures of the battery cell 11, reaches a reset threshold such as 30 degrees Celsius and 35 degrees Celsius, respectively.

In an instance in which the reset threshold is met, the battery charging monitor 100 may cause a second charging rate to be applied to the battery cell 11. The second battery charging rate may be a low charging rate, such as about 1.0 of the capacity of the battery or 5.1 Ah in the current example. In an example embodiment, charging rate monitor may iteratively repeat similar off-on-drop in current cycles.

The battery charging monitor 100 may measure cell voltage of the battery cell 11, as discussed above and compare the cell voltage to a charging voltage threshold. In an instance in which the charging voltage threshold, such as 4.2 V in the current example, is reached, the battery charging monitor may apply a charging rate to maintain a constant voltage, e.g., a constant voltage charging rate.

In the present example, the 5.3 Ah Boston Power cell reached 89 percent charge capacity in 62 minutes, at which the battery charging monitor 100 switched to a constant voltage charging rate for 35 minutes to reach from 89 percent to 99.9 percent charge capacity. The fast charging protocol may be about twice as fast as conventional Constant Current-Constant Voltage methods.

In an example embodiment, the charging rates associated with the charging rate temperature thresholds maybe based on SoC correlations, as discussed above in reference to FIGS. 4-6. For example, the first charging rate may be about 1.87 of the capacity of the battery up to 13 percent SoC, a the second charging rate may be about 1.0 of the capacity of the battery from 13 percent to 63 percent SoC, and a third charging rate may be about 0.7 of the capacity of the battery from 63 percent to 89 percent.

The technique and the data described in FIG. 7 illustrate another advantage over a conventional charger. The battery charging monitor 100 may be a "capacity independent charger" capable of self-determining the currents needed to charge a battery 10 utilizing the fast charging protocol. At initiation of the battery charge, the rate at which the temperatures ($T_{anode}$ and/or $T_{cathode}$) are changing may be indicative of the state of charge of the battery 10. In an example embodiment, a combination of the charging current, the rate of change in $T_{anode}$ and/or $T_{cathode}$, and changes of the $\Delta Ta/\Delta SoC$ slope in the charging rate may be utilized to determine the state of charge of the battery 10 and estimate the actual capacity of the battery 10. The determination of the state of charge of the battery 10 and/or the estimation of the actual capacity of the battery 10 may be performed autonomously, by the battery charging monitor 100, e.g., without user action. Once the capacity of the battery 10 is determined, the capacity-independent-charger, e.g., the battery charging monitor 100 may autonomously determine the magnitude of the charging current and the charging rate, as described above.

FIGS. 8 and 9 are flowcharts of methods and program products according to an example embodiment of the battery charging system 100. It will be understood that each block of the flowchart, and combinations of blocks in the flowchart, may be implemented by various means, such as hardware, firmware, microcontroller 52, processing circuitry 50, and/or other device associated with execution of software including one or more computer program instructions. For example, one or more of the procedures described above may be embodied by computer program instructions. In this regard, the computer program instructions which embody the procedures described above may be stored by a memory device of a user terminal and executed by a microcontroller in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment is shown in FIG. 8. The method may be employed for a battery charging system. The method may include, measuring an internal temperature of at least one battery cell at operation 416, and determining a rate of change of the internal temperature of the at least one battery cell based on the internal temperature of the at least one battery cell at operation 418. At operation 420, the method includes determining a state of charge of the at least one battery cell based on the rate of change of the internal temperature, and causing a charging rate to be applied to the at least one battery cell based on the determined state of charge at operation 422.

In an example embodiment, the method may optionally include, as denoted by the dashed box, applying a voltage across at least one battery cell at a first AC frequency, at operation 402. The method may also include, measuring a first phase shift across the at least one battery cell at operation 404, and determining a temperature an anode of the at least one battery cell based on the first phase shift at operation 406. At operation 410, the method may also include applying a voltage across at least one battery cell at a second AC frequency. The method may include, at operation 412, measuring a second phase shift across the at least one battery cell, at operation 414, and determining measuring a second phase shift across the at least one battery cell. At operation 424, the method may also include comparing the internal temperature of the at least one battery cell to a temperature threshold and, at operation 426, causing the charging rate to be reduced in an instance in which the internal temperature exceeds the temperature threshold. At operation 428, the method may further include, measuring a cell voltage of the at least one battery cell, at operation 430, comparing the cell voltage of the at least one battery cell to a voltage threshold. The method may additionally include, at operation 432, causing the charging rate to be reduced in an instance in which the cell voltage exceeds the voltage threshold.

An additional or alternative method according to an embodiment is shown in FIG. 9. The method may be employed for a battery charging system. The method may include, measuring an internal temperature of at least one battery cell at operation 916, comparing the internal temperature of the at least one battery cell to one or more temperature thresholds at operation 918, and applying a charging rate based on the internal temperature and the one or more charging temperature thresholds at operation 920.

In some example embodiments, the method may optionally include, as denoted by the dashed box, applying a voltage across at least one battery cell at a first AC frequency, at operation 902. The method may also include, measuring a first phase shift across the at least one battery cell at operation 904, and determining a temperature an anode of the at least one battery cell based on the first phase shift at operation 906. At operation 910, the method may also include applying a voltage across at least one battery cell at a second AC frequency. The method may include, at operation 912, measuring a second phase shift across the at least one battery cell, at operation 914, and determining measuring a second phase shift across the at least one battery cell. In an example embodiment, the method may also include measuring a cell voltage of the at least one battery cell at operation 922, comparing the cell voltage to a charging voltage threshold at operation 924, and applying a constant voltage charging rate in an instance in which the cell voltage satisfies the charging voltage threshold at operation 926.

In an example embodiment, an apparatus for performing the methods of FIGS. 8 and 9 above may comprise a processor (e.g., the microcontroller 52) or processing circuitry configured to perform some or each of the operations (402-432 and 902-926) described above. The processor may, for example, be configured to perform the operations (402-432 and 902-926) by performing hardware implemented logical functions, executing stored instructions, or executing algorithms for performing each of the operations. In an example embodiment, the determined state of charge comprises a determined state transition. In some embodiments, the internal temperature of the at least one battery cell is at least an anode temperature of the at least one battery cell. In some example embodiments, measuring the internal temperature of the at least one battery cell includes applying a voltage across the at least one battery cell at a first alternating current (AC) frequency, measuring a first phase shift across the at least one battery cell, and determining the temperature of an anode of the at least one battery cell based on the first phase shift. In an example embodiment, measuring the internal temperature of the at least one battery cell includes applying a voltage across the at least one battery cell at a second (AC) frequency, measuring a second phase shift across the at least one battery cell, and determining the temperature of a cathode of the at least one battery cell based on the second phase shift. In some example embodiments, the battery charging monitor also includes a multiplexor, the at least one battery cell includes a plurality of battery cells electrically connected to the sensor by the multiplexor, and the sensor is configured to measure an internal temperature of each battery cell of the plurality of battery cells. In an example embodiment, the electrical connection to the at least one battery cell includes a connection to each terminal of the at least one battery cell, and no portion of the sensor is within the at least one battery cell. In some example embodiments, the microcontroller is further configured to compare the internal temperature of the at least one battery cell to a temperature threshold and cause the charging rate to be reduced in an instance in which the internal temperature exceeds the temperature threshold. In an example embodiment, the sensor is further configured to measure a cell voltage of the at least one battery cell. The microcontroller is further configured to compare the cell voltage to a voltage threshold and cause the charging rate to be reduced in an instance in which the cell voltage exceeds the voltage threshold. In some example embodiments, causing the charging rate to be applied to the at least one battery cell based on the determined state of charge comprises applying a first charging rate in an instance in which the state of charge is below a first state of charge threshold and applying a second charging rate in an instance in which the state of charge is equal to or above the state of charge threshold. In an example embodiment, the state of charging threshold is about 60 percent. In some example embodiments, the first charging rate is less than or about 0.7 of the capacity of the at least one battery. In an example embodiment, the second charging rate is greater than about 0.7 of the capacity of the at least one battery. In some example embodiments, the at least one battery comprises a lithium ion battery. In an example embodiment, causing the charging rate to be applied to the at least one battery cell based on the comparison of the internal temperature to the one or more charging temperature thresholds includes applying a first charging rate in an instance in which the state of charge is below a first charging temperature threshold, reducing the charging rate, and applying a second charging rate in an instance in which the first charging temperature threshold has been met. In some example embodiments, the sensor is further configured to measure a cell voltage of the at least one battery cell and the microcontroller is further configured to compare the cell voltage to a charging voltage threshold and apply a constant voltage charging rate in an instance in which the cell voltage satisfies the charging voltage threshold.

Many modifications and other embodiments of the measuring device set forth herein will come to mind to one skilled in the art to which these inventions pertain having the benefit of the teachings presented in the foregoing descriptions and the associated drawings. Therefore, it is to be understood that the measuring devices are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A battery charging monitor comprising:
   a first sensor and a second sensor electrically connected to at least one battery cell of at least one battery, wherein the first sensor is configured to measure an internal temperature of the at least one battery cell and the second sensor is configured to measure a cell voltage of the at least one battery cell; and
   a microcontroller configured to:
   determine a rate of change of the internal temperature of the at least one battery cell based on the internal temperature of the at least one battery cell;
   determine a state of charge of the at least one battery cell based on the rate of change of the internal temperature;
   cause a charging rate to be applied, by a battery charger, to the at least one battery cell based on the determined state of charge;
   compare the cell voltage to a voltage threshold; and
   cause the charging rate to be reduced in an instance in which the cell voltage exceeds the voltage threshold.

2. The battery charging monitor of claim 1, wherein the determined state of charge comprises a determined state transition.

3. The battery charging monitor of claim 1, wherein the internal temperature of the at least one battery cell comprises at least an anode temperature of the at least one battery cell.

4. The battery charging monitor of claim 1, wherein measuring the internal temperature of the at least one battery cell comprises:
   applying a current across the at least one battery cell at a first alternating current (AC) frequency,
   measuring a resultant AC voltage across the battery cell,
   measuring a first phase shift between the applied AC current and the resultant AC voltage across the at least one battery cell, and
   determining the temperature of an anode of the at least one battery cell based on the first phase shift.

5. The battery charging monitor of claim 1, wherein measuring the internal temperature of the at least one battery cell comprises:
   applying a voltage across the at least one battery cell at a second (AC) frequency,
   measuring a resultant AC current across the battery cell,
   measuring a second phase shift between the applied AC voltage and the resultant AC current across the at least one battery cell, and
   determining the temperature of a cathode of the at least one battery cell based on the second phase shift.

6. The battery charging monitor of claim 1 further comprising:
   a multiplexor,
   wherein the at least one battery cell comprises a plurality of battery cells electrically connected to the first sensor by the multiplexor, and
   wherein the first sensor is configured to measure an internal temperature of each battery cell of the plurality of battery cells.

7. The battery charging monitor of claim 1, wherein the electrical connection to the at least one battery cell comprises a connection to each terminal of the at least one battery, and no portion of the first sensor is within the at least one battery cell.

8. The battery charging monitor of claim 1, wherein the microcontroller is further configured to:
   compare the internal temperature of the at least one battery cell to a temperature threshold; and
   cause the charging rate to be reduced in an instance in which the internal temperature exceeds the temperature threshold.

9. The battery charging monitor of claim 1, wherein causing the charging rate to be applied to the at least one battery cell based on the determined state of charge comprises:

applying a first charging rate in an instance in which the state of charge is below a first state of charge threshold, and applying a second charging rate in an instance in which the state of charge is equal to or above the state of charge threshold.

10. The battery charging monitor of claim 9, wherein the state of charging threshold is about 60 percent.

11. The battery charging monitor of claim 9, wherein the first charging rate is less than or about 0.7 of a capacity of the at least one battery.

12. The battery charging monitor of claim 9, wherein the second charging rate is greater than about 0.7 of a charging capacity of the at least one battery.

13. The battery charging monitor of claim 1, wherein the at least one battery comprises a lithium ion battery.

14. A battery charging monitor comprising:
a sensor electrically connected to at least one battery cell of at least one battery, wherein the sensor is configured to measure an internal temperature of the at least one battery cell; and
a microcontroller configured to:
compare the internal temperature of the at least one battery cell to one or more charging temperature thresholds; and
cause a charging rate to be applied, by a battery charger, to the at least one battery cell based on the comparison of the internal temperature to the one or more charging temperature thresholds, wherein causing the charging rate to be applied comprises:
applying a first charging rate in an instance in which the state of charge is below a first charging temperature threshold,
reducing the charging rate, and
applying a second charging rate in an instance in which the first charging temperature threshold has been met.

15. The battery charging monitor of claim 14, wherein the internal temperature of the at least one battery cell comprises at least an anode temperature of the battery.

16. The battery charging monitor of claim 14, further comprising a second sensor configured to measure a cell voltage of the at least one battery cell, and
wherein the microcontroller is further configured to:
compare the cell voltage to a charging voltage threshold, and
apply a constant voltage charging rate in an instance in which the cell voltage satisfies the charging voltage threshold.

17. The battery charging monitor of claim 14, wherein measuring the internal temperature of the at least one battery cell comprises:
applying a current across the at least one battery cell at a first alternating current (AC) frequency,
measuring a resultant AC voltage across the battery cell,
measuring a first phase shift between the applied AC current and the resultant AC voltage across the at least one battery cell, and
determining the temperature of an anode of the at least one battery cell based on the first phase shift.

18. The battery charging monitor of claim 17, wherein measuring the internal temperature of the at least one battery comprises:
applying a voltage across the at least one battery cell at a second (AC) frequency,
measuring a resultant AC current across the battery cell,
measuring a second phase shift between the applied AC voltage and the resultant AC current across the at least one battery cell, and
determining the temperature of a cathode of the at least one battery cell based on the second phase shift.

19. A battery charging monitor comprising:
a sensor electrically connected to at least one battery cell of at least one battery, wherein the sensor is configured to measure an internal temperature of the at least one battery cell; and
a microcontroller configured to:
determine a rate of change of the internal temperature of the at least one battery cell based on the internal temperature of the at least one battery cell;
determine a state of charge of the at least one battery cell based on the rate of change of the internal temperature; and
cause a charging rate to be applied, by a battery charger, to the at least one battery cell based on the determined state of charge, wherein causing the charging rate to be applied to the at least one battery cell comprises:
applying a first charging rate in an instance in which the state of charge is below a first state of charge threshold, and
applying a second charging rate in an instance in which the state of charge is equal to or above the state of charge threshold.

* * * * *